(12) United States Patent
Tater et al.

(10) Patent No.: US 10,831,990 B1
(45) Date of Patent: Nov. 10, 2020

(54) DEBIASING TEXTUAL DATA WHILE PRESERVING INFORMATION

(71) Applicant: International Business Machines Corporation, Armonk, NY (US)

(72) Inventors: Tarun Tater, Bangalore (IN); Monika Gupta, Gurugram (IN); Sampath Dechu, Bangalore (IN); Gargi B. Dasgupta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/407,262

(22) Filed: May 9, 2019

(51) Int. Cl.
| | | |
|---|---|---|
| *G06F 40/166* | (2020.01) | |
| *G06F 16/34* | (2019.01) | |
| *G06F 40/30* | (2020.01) | |
| *G06F 40/169* | (2020.01) | |
| *G06F 40/226* | (2020.01) | |

(52) U.S. Cl.
CPC .......... *G06F 40/166* (2020.01); *G06F 16/345* (2019.01); *G06F 40/169* (2020.01); *G06F 40/226* (2020.01); *G06F 40/30* (2020.01)

(58) Field of Classification Search
None
See application file for complete search history.

(56) References Cited

U.S. PATENT DOCUMENTS

| | | |
|---|---|---|
| 8,078,453 B2 | 12/2011 | Shaw |
| 9,432,325 B2 | 8/2016 | Skiba |
| 9,866,516 B1 | 1/2018 | Fisher |
| 10,303,771 B1 * | 5/2019 | Jezewski .............. G06F 40/284 |
| 2006/0200341 A1 * | 9/2006 | Corston-Oliver ..... G06F 16/353 704/5 |
| 2011/0078167 A1 * | 3/2011 | Sundaresan ............ G06F 40/30 707/765 |
| 2012/0245924 A1 | 9/2012 | Brun |

(Continued)

FOREIGN PATENT DOCUMENTS

CN 102033865 A 4/2011

OTHER PUBLICATIONS

Hu, et al., "Touch Your Heart: A Tone-aware Chatbot for Customer Care on Social Media", 12 pps., Mar. 15, 2018, (to appear in CHI 2018), https://arxiv.org/pdf/1803.02952.pdf.

(Continued)

*Primary Examiner* — Asher D Kells
(74) *Attorney, Agent, or Firm* — Marcus Walker (57) ABSTRACT

Aspects of the present invention disclose a method for debiasing text by neutralizing subjective information while preserving relevant information. The method includes one or more processors determining a sentiment of textual data. The method further includes extracting information that is relevant to resolving a topic that is represented in the textual data. The method further includes debiasing the information that is relevant to resolving a topic that is represented in the textual data. The method further includes validating that the debiased information includes the information that is relevant to resolving the topic that is represented in the textual data. The method further includes generating debiased textual data, the debiased textual data including the debiased information and masking the determined sentiment of the textual data.

20 Claims, 3 Drawing Sheets

(56) References Cited

U.S. PATENT DOCUMENTS

| | | | | |
|---|---|---|---|---|
| 2015/0193482 | A1* | 7/2015 | Kaushansky | G06F 16/35 707/741 |
| 2016/0062967 | A1* | 3/2016 | Cantarero | G06F 16/35 715/230 |
| 2016/0241499 | A1 | 8/2016 | Hailpern | |
| 2016/0321243 | A1* | 11/2016 | Walia | G06F 16/35 |
| 2017/0109651 | A1* | 4/2017 | Bruno | G06F 40/274 |
| 2018/0176380 | A1 | 6/2018 | McCoy | |
| 2019/0236613 | A1* | 8/2019 | Dinh | G06F 40/30 |
| 2020/0004816 | A1* | 1/2020 | Kieser | G06F 17/18 |

OTHER PUBLICATIONS

Ortu, M., Adams, B., Destefanis, G., Tourani, P., Marchesi, M. and Tonelli, R., May 2015. Are bullies more productive? Empirical study of affectiveness vs. issue fixing time. In 2015 IEEE/ACM 12th Working Conference on Mining Software Repositories (MSR) on (pp. 303-313). IEEE.www.dsf.unica.it/~roberto/pubb12_Tonelli_Roberto_rtdaMR_1016_01B1.pdf.

Rutner, P.S. Hardgrave, B.C. and McKnight, D.H., Sep. 2008. "Emotional dissonance and the information technology professional". Mis Quarterly, vol. 32, No. 3, pp. 635-652, http://www.jstor.org/stable/25148859.

Sennrich, R., Haddow, B. and Birch, A., 2016. Controlling politeness in neural machine translation via side constraints. In Proceedings of the 2016 Conference of the North American Chapter of the Association for Computational Linguistics: Human Language Technologies.homepages.inf.ed.ac.uk/abmayne/publications/sennrich2016NAACL.pdf, 6 pages.

Takeno, S., Nagata, M. and Yamamoto, K., 2017. Controlling Target Features in Neural Machine Translation via Prefix Constraints. In Proceedings of the 4th Workshop on Asian Translation (WAT2017), 9 pps., http://aclweb.org/anthology/W17-5702.

* cited by examiner

DEBIASING TEXTUAL DATA WHILE PRESERVING INFORMATION

BACKGROUND OF THE INVENTION

The present invention relates generally to the field of unstructured data processing, and more particularly to debiasing text.

In recent years, there has been an increase in demand to utilize the advanced techniques for analyzing large and/or complex data sets. In particular, natural language processing (NLP), which is a sub-field of computer science that enables a computer to process and analyze large amounts of natural language data. Sentiment analysis utilizes NLP, computational linguistics, and text analysis to extract and analyze subjective information. A basic task in sentiment analysis is classifying the polarity of a given text where an expressed opinion of the given text is positive, negative, or neutral. Advance sentiment classification techniques are able to determine an expressive tone of a given text as well.

Natural language generation (NLG) is an aspect of language technology that focuses on generating natural language from structured data or structured representations such as a logical form, formally or informally. In generating text NLG utilizes stages (e.g., content determination, document structuring, aggregation, lexical choice, referring expression generation, realization, etc.) to organize data and create text. There are multiple techniques for evaluating performance of NLG systems (e.g., task based, human ratings, and metrics, etc.).

A neural network is a computing system modeled on the human brain, which provides a framework for many different machine learning algorithms to work together and process complex data inputs. A neural network is initially trained, where training includes providing input data and telling the network what the output should be. Neural networks have been used on a variety of tasks (e.g., speech recognition, machine translation, etc.).

SUMMARY

Aspects of the present invention disclose a method, computer program product, and system for debiasing text by neutralizing subjective information while preserving relevant information. The method includes determining, by one or more processors, a sentiment of textual data. The method further includes extracting, by one or more processors, information that is relevant to resolving a topic that is represented in the textual data. The method further includes debiasing, by one or more processors, the information that is relevant to resolving a topic that is represented in the textual data. The method further includes validating, by one or more processors, that the debiased information includes the information that is relevant to resolving the topic that is represented in the textual data. The method further includes generating, by one or more processors, debiased textual data, the debiased textual data including the debiased information and masking the determined sentiment of the textual data.

DETAILED DESCRIPTION

Embodiments of the present invention recognize that, in recent years, there has been an increase in interaction between IT professionals and system users. Therefore, there has been an increase in the number of issues the IT professionals have to handle. Comments included in these issues often contain subjective information which often require sentiment analysis. Sentiment analysis is the use of natural language processing (NLP), text analysis, computational linguistics, and biometrics to identify, extract, and quantify subject information. Subjective information covers a range of information like polarity, emotional states, subjectivity, objectivity, and features or aspects.

Embodiments of the present invention allow for debiasing text by modifying subjective information while preserving relevant information. Embodiments of the present invention detect relevant information of text annotated with subjective information and discarding irrelevant information of the text. Embodiments of the present invention extract and retain information corresponding to circumstances of a user from text.

Some embodiments of the present invention recognize a need for an intelligent customer feedback system that is able detect and perform debiasing on negative comments while retaining pertinent information. Consequently, customer service professionals are overwhelmed with negative comments and posts that create emotional dissonance and ultimately decrease productivity and increase resolution time of an issue. Various embodiments of the present invention solve this by utilizing cognitive analysis, machine learning, natural language processing, and natural language generation to detect relevant information and sentiment of a sentence, and debias the sentences while retaining the relevant information and sentence sentiment of textual data.

Embodiments of the present invention can operate to increases efficiency of a computer system by reducing the amount of memory resources utilized by discarding irrelevant information. Additionally, various embodiments of the present invention improve the efficiency of network resources by reducing the amount of data the system has to transmit.

Implementation of embodiments of the invention may take a variety of forms, and exemplary implementation details are discussed subsequently with reference to the Figures.

Figure 1:
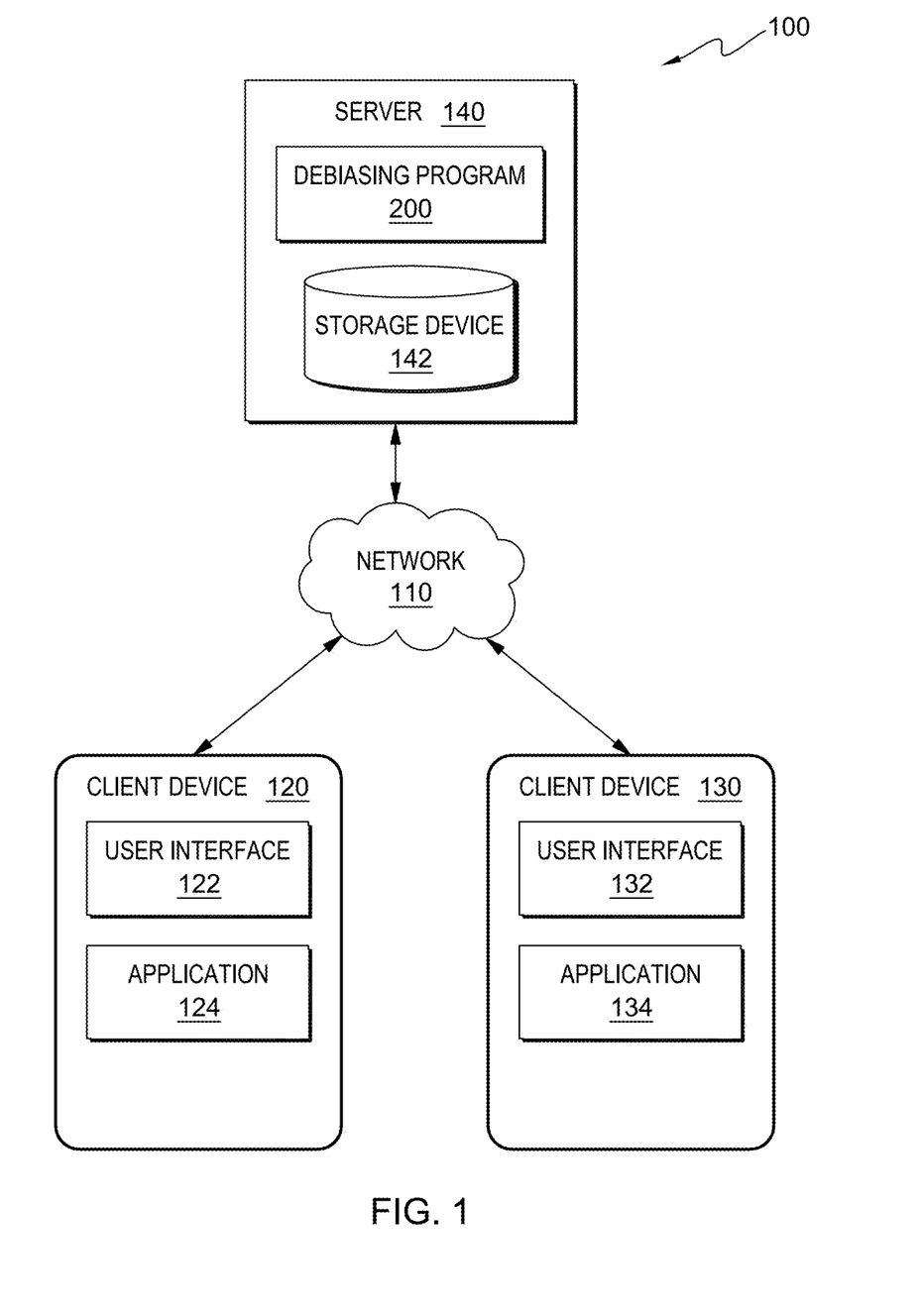
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes client device 120, client device 130, and server 140, all interconnected over network 110. In one embodiment, client device 120, client device 130, and server 140 communicate through network 110. Network 110 can be, for example, a local area network (LAN), a telecommunications network, a wide area network (WAN), such as the Internet, or any combination thereof, and include wired, wireless, or fiber optic connections. In general, network 110 can be any combination of connections and protocols, which will support communications between client device 120, client device 130, and server 140, in accordance with embodiments of the present invention. For example, a user of a mobile device (e.g., client device 120) and a user a laptop (e.g., client device 130) use the Internet (e.g., network 110) to connect to a chatroom (e.g., synchronous conferencing, asynchronous conferencing, etc.) hosted on a server (e.g., server 140) and transmit and receive data to one another.

Client device 120 and client device 130 are representative of a device capable of executing computer readable program instructions. In various embodiments of the present invention, client device 120 and client device 130 may be a workstation, personal computer, digital video recorder, media player, personal digital assistant, mobile phone, or any other device capable of executing computer readable program instructions, in accordance with embodiments of the present invention. For example, client device 120 is a mobile device and client device 130 is a laptop, which are participating in a customer support chatroom. Client device 120 and client device 130 may include components as depicted and described in further detail with respect to FIG. 3, in accordance with embodiments of the present invention.

Client device 120 and client device 130 include respective instances of a user interface (i.e., user interface 122 and user interface 132) and applications (i.e., application 124 and application 134), which each correspond to a respective device and can perform equivalent functions. In various embodiments of the present invention, a user interface is a program that provides an interface between a user of a device and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Client device 120 and client device 130 include respective instances of an application, which correspond to a respective device and can perform equivalent functions in the respective devices. In various embodiments of the present invention an application frequently serves to provide a user with similar services accessed on personal computers (e.g., web browser, conferencing program, data syncing program, or other media, etc.). In one embodiment, a user utilizes application 124 to transfer and receive data to and from a user utilizing application 134. For example, a user uses a conferencing program (e.g., application 124) of a mobile device (e.g., client device 120) to chat with a client using a conference program (e.g., application 134) of a laptop (e.g., client device 130). In another example, a client submits a customer feedback ticket using a conferencing program using a laptop and a user responds to the customer feedback ticket using a conferencing program of a mobile device (e.g., client device 120).

In various embodiments, users authorize debiasing program 200 to collect and store information associated with devices and users, which have authorized the collection of information (i.e., users that have opted-in), in storage device 142. In one scenario, an owner of client device 120 authorizes masking program 200 to collect and store text data (e.g., comments, customer feedback tickets, support chat history, etc.) of client device 120. In another scenario, an owner of client device 120 authorizes debiasing program 200 to generate a comment on behalf the owner using collected comment of client device 120. In an alternative embodiment, users opt-in to utilize debiasing program 200. For example, a user visits a website associated with debiasing program 200 and the users accept the terms and conditions of debiasing program 200 as a part of the registration process.

Server 140 includes storage device 142 and debiasing program 200. Storage device 142 can be implemented with any type of storage device, for example, persistent storage 305, which is capable of storing data that may be accessed and utilized by client device 120, client device 130 and server 140, such as a database server, a hard disk drive, or a flash memory. Storage device 142 stores numerous types of data which may include database or repository. In various embodiments of the present invention storage device 142 may include a plurality of databases that include text of comments, customer feedback tickets, support chat history, and/or data debiasing program 200 derives from text. For example, storage device 142 may include a plurality of databases that contain relevant information that debiasing program 200 extracts from a client comment.

In one embodiment, debiasing program 200 determines a polarity of text. Generally, polarity in sentiment analysis is a sentiment orientation (e.g., positive, neutral, negative, etc.) in written or spoken language. In another embodiment, debiasing program 200 utilizes NLP (e.g., sentiment analysis) to identify polarity of text of a user. For example, debiasing program 200 uses sentiment analysis to determine that a comment of a user in a chat has a negative polarity. In another embodiment, debiasing program 200 utilizes NLP (e.g., natural language understanding) to determine a sentiment of text of the user. For example, debiasing program 200 uses natural language understanding (NLU) and NLP triggers to detect a tone of a user is angry (e.g., expressive tone) by identifying an intended semantic meaning of a word used in a comment of the user in a chat. In this example, debiasing program 200 determines that based on the detected tone and semantic meaning of the words used in the comment, the comment has a negative sentiment.

In another embodiment, debiasing program 200 utilizes NLP (e.g., deep parsing, predicate logic, natural language generation, etc.) to neutralize content of text of a user. For example, debiasing program 200 parses a comment of a user in a chat to identify relevant information and discard non-relevant information. In this example, debiasing program 200 utilizes natural language generation (NLG) to generate a neutralized comment from the identified relevant information (e.g., structure data). In another embodiment, debiasing program 200 utilizes a neural network to determine an impact type included in text of a user. For example, debiasing program 200 extracts words of a comment of a user in a chat that are relevant to factors of that impact the user (e.g., productivity loss, key performance indicators, service level agreements, over-priced products, low quality, etc.) and inputs the extracted words into a pretrained neural network that classifies impact type of the comment. In yet another embodiment, debiasing program 200 generates text that includes client impact and masked sentiment.

Figure 2:
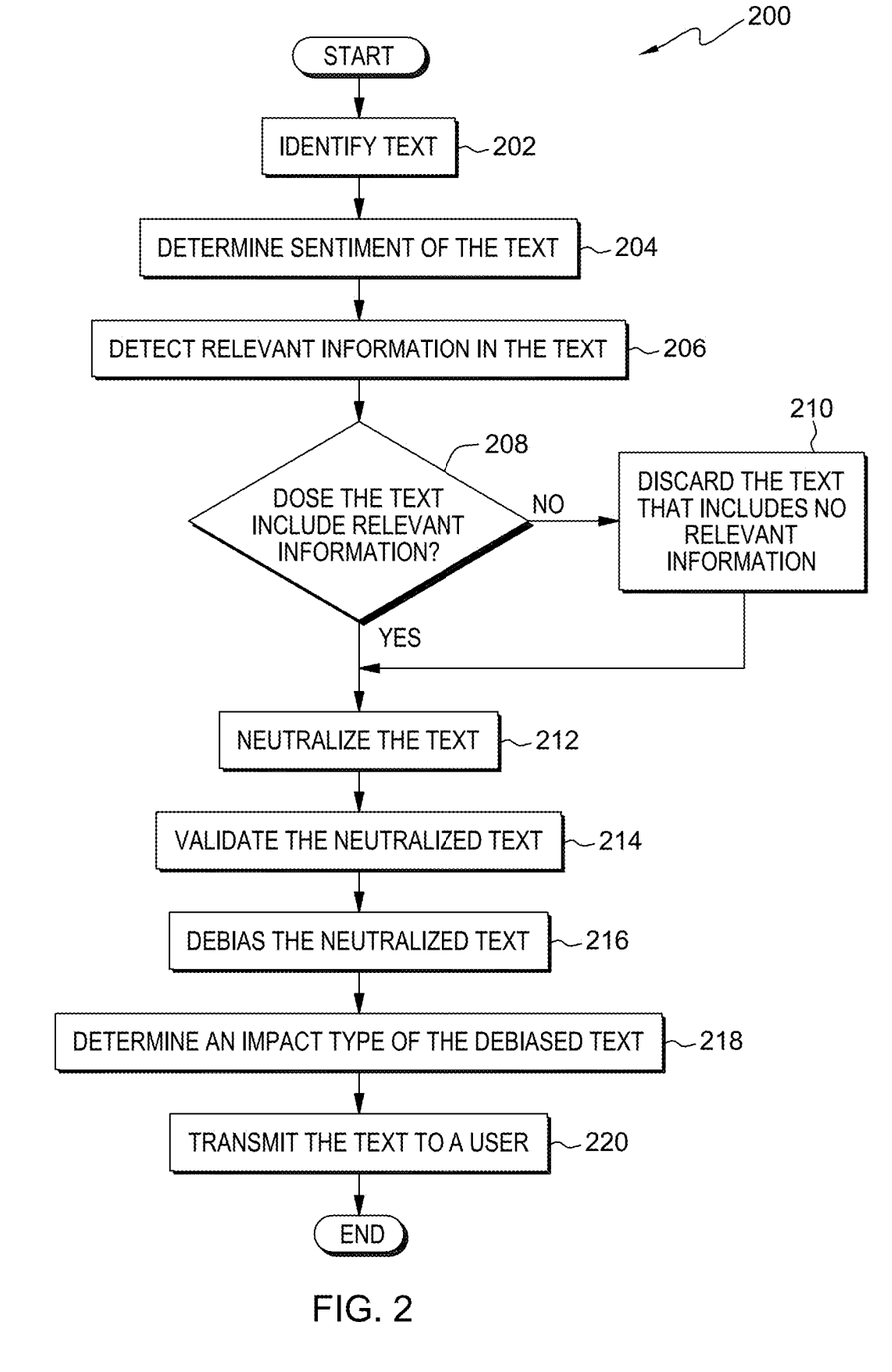
FIG. 2 is a flowchart depicting operational steps of a program for debiasing text by neutralizing subjective information while preserving relevant information, in accordance with embodiments of the present invention.

FIG. 2 is a flowchart depicting operational steps of debiasing program 200, a program for debiasing text by neutralizing subjective information while preserving relevant information, in accordance with embodiments of the present invention. In one embodiment, debiasing program 200 initiates in response to a user initiating application 124 using client device 120. For example, debiasing program 200 initiates in response to debiasing program 200 detecting a user opening a chat program (e.g., application 124) on a mobile device (e.g., client device 120). In another embodiment, debiasing program 200 initiates in response to a user receiving text from a client. For example, debiasing program 200 in response to a user accessing assigned feedback from a customer ticketing system (e.g., application 124). In another embodiment, debiasing program 200 initiates to analyze an existing set of textual data. For example, debiasing program 200 automatically initiates to debias feedback of a customer ticketing system.

In step 202, debiasing program 200 identifies text. In various embodiments of the present invention, the text (e.g., comments, feedback tickets, emails, etc.) are analyzed at a document and sentence level. In one embodiment, debiasing program 200 stores data of application 124 in storage device 142. For example, debiasing program 200 retrieves a customer feedback ticket from a ticketing system (e.g., application 124) and stores a comment in a database (e.g., storage device 142) of a server. In another example, debiasing program 200 stores a comment of a customer service chat (e.g., application 124) in a database of a server. In another embodiment, debiasing program 200 automatically initiates (e.g., after a defined period of time) and identifies a set of textual data in a customer ticketing system (e.g., a plurality of questions, responses, comments, etc., which are posted on a website).

In step 204, debiasing program 200 determines sentiment of the text. In various embodiments of the present invention, debiasing program 200 determines a polarity and sentiment of text the user provides. In one embodiment, debiasing program 200 determines a sentiment of text of a user. For example, debiasing program 200 utilizes NLP to identify words or phrases of a sentence of a customer feedback ticket that are associated with having a negative, neutral, or positive connotation. In this example, debiasing program 200 classifies the sentence of the customer service ticket as having a negative, neutral, or positive polarity based on an overall sentiment of the words or phrases of the sentence of the customer feedback ticket.

In another embodiment, debiasing program 200 determines an expressive tone based on text of a user. For example, debiasing program 200 parses a sentence of a customer feedback ticket to detect words of the sentence that are associated with emotions and classifies an expressive tone of the sentence based on the associations of the detected words. In another example, debiasing program 200 utilizes cognitive linguistics to identify tones in a sentence of a comment of a user by deriving the context of the text (e.g., a general tone) and the semantic meaning of the words used by the user in constructing the sentence in the text. In this example, debiasing program 200 uses the semantics of the words and identified tones to classify the expressive tone of the sentence.

In another embodiment, debiasing program 200 rates a sentiment and expressive tone based on text of the user. For example, debiasing program 200 utilizes NLP and cognitive linguistic techniques to classify a polarity of a comment and an expressive tone of the comment based on the textual data of the comment. In this example, debiasing program 200 parses the comment of the user to detect words commonly associated with a polarity (e.g., negative, neutral, positive, etc.) and tone. Additionally, the detected words associated with the polarity are ranked and assigned an integer on a scale of −5 to +5 (i.e., most negative up to most positive) based on how the detected word relates to a concept in a specified domain (e.g., customer service, product support, issue reporting, etc.), which allow ratings of words to be adapted to the concepts in context with the specified environment. Furthermore, debiasing program 200 assigns a score to an identified polarity and/or expressive tone of the comment based on a rank of the detected words included in the comment. In yet another embodiment, debiasing program 200 annotates textual data of a user with a determined sentiment and/or expressive tone. For example, debiasing program 200 annotates a comment of a customer feedback chat with a positive polarity (e.g., determined sentiment).

In step 206, debiasing program 200 detects relevant information in the text. In various embodiments, the detected relevant information corresponds to information that debiasing program 200 can utilize to understand and resolve an issue of a user that is represented in textual data of the user. In an example embodiment, debiasing program 200 determines whether the text of a user, which does not include annotated data, includes relevant information. For example, debiasing program 200 utilizes deep parsing to create a structural representation of a sentence of a comment in a customer chat. In this example, debiasing program 200 captures long-distance dependencies and underlying predicate argument structures and utilizes predicate logic to determine whether the sentence is contextually related to the specified domain of discourse (i.e., the set of entities over which certain variables of interest in some formal treatment may range) based on elements of the structural representation of the sentence. In another example, debiasing program 200 utilizes ontology driven parsing to identify relevant information (e.g., entities, actions, observed behavior, emotions, products, product versions, error codes, etc.) with respect to one or more domains (e.g., customer support, sentiments, etc.). In this example, debiasing program 200 parses a sentence of a comment of a customer chat, derives relations between identified words and/or phrases and the one or more domains, and determines that the sentence includes relevant information.

In another embodiment, debiasing program 200 utilizes machine learning and/or deep learning techniques to train a binary classifier and determine whether the annotated text of a user includes relevant information. For example, debiasing program 200 utilizes supervised learning (e.g., support vector machines (SVMs)) to train a binary classifier. In this example, debiasing program 200 inputs labeled data (i.e., sentences of a comment that are labeled as including or not including relevant information) into a machine learning algorithm or artificial neural network. Additionally, debiasing program 200 uses the pretrained binary classifier to classify a sentence of a comment as including or not including relevant information.

In decision step 208, debiasing program 200 determines whether the text include relevant information. If debiasing program 200 determines that the text does not include relevant information (decision step 208, "NO" branch), then debiasing program 200 discards the text segment of the text that does not include relevant information (step 210). In one scenario, if debiasing program 200 parses a sentence of a comment of a customer feedback chat (previously discussed with regard to step 206) and determines that no information relevant to a domain of the customer feedback chat is identified, then debiasing program 200 discards the sentence that includes no information relevant to the domain of the customer feedback chat. In another scenario, if debiasing program 200 determines that a sentence of a comment of a customer feedback chat is classified as having no information relevant to a domain of the customer feedback chat (previously discussed with regard to step 206), debiasing program 200 discards the sentence that includes no information relevant to the domain of the customer feedback chat. In yet another scenario, if debiasing program 200 determines that a sentence of a comment of a customer feedback chat does not include information relevant to a domain of the customer feedback chat, but includes a sentiment of the comment, then debiasing program 200 retains the polarity and discards the sentence that includes no information relevant to the domain of the customer feedback chat.

If debiasing program 200 determines that the text of the user includes a sentiment and relevant information (decision step 208, "YES" branch), debiasing program 200 retains the sentiment and the relevant information and neutralizes the sentiment of the text (step 212). For example, debiasing program 200 determines that a sentence of a comment of a customer feedback chat includes information relevant to a domain of the customer feedback chat (previously discussed with regard to step 206) and a polarity of the comment. In this example, in response, debiasing program 200 masks the polarity and/or expressive tone of the comment while retaining the information relevant to the domain of the customer feedback chat and the polarity and/or expressive tone (e.g., sentiment) of the comment.

In step 210, debiasing program 200 discards the text that includes no relevant information. In one embodiment, debiasing program 200 removes the text that does not include information relevant to one or more domains of the textual data. For example, debiasing program 200 extracts and deletes the sentence of a comment of a customer feedback chat that does not include information relevant to a domain of the customer feedback chat. In another embodiment, debiasing program 200 retains sentiment of the textual data and discards a segment of the textual that does not include relevant information. For example, debiasing program 200 can extract a polarity and/or an expressive tone from an analysis of a sentence of a comment of a customer feedback chat, annotate the comment of the customer feedback chat with the polarity and/or expressive tone of the user, and discard the sentence that includes no information relevant to a domain of the customer feedback chat. Thus, increasing the amount of storage capacity of a computing system.

In step 212, debiasing program 200 neutralizes the text. In various embodiments of the present invention debiasing program 200 utilizes various techniques to neutralize the text based on whether sufficient data is available. In one embodiment, debiasing program 200 utilizes a pretrained artificial neural network to create a vector space using a large corpus of text (i.e., the corpus includes polarity neutral sentences). Additionally, debiasing program 200 inputs the text into the pretrained artificial neural network and identifies a semantic vector representation that is closest in proximity to the text in the vector space. For example, debiasing program 200 uses word embedding techniques (e.g., word2vec, sentence2vec, doc2vec, etc.) to pretrain a neural network using labeled polarity neutral sentences and inputs a sentence of a comment of a customer feedback chat into a two-layer neural network. In this example, debiasing program 200 identifies a semantically similar neutral sentence based on proximity in distance, where the identified semantically similar neutral sentence is nearest in proximity to the input sentence with respect to other sentences within the vector space.

In another embodiment, debiasing program 200 utilizes a rule-based system to discard a segment of the text based on identifying the segment in a vocabulary of keywords of a specific domain (i.e., words that depict and intensify emotional polarity in the text). Additionally, debiasing program 200 utilizes NLG techniques and a bag-of-words model (BoW) to reconstruct the text. For example, debiasing program 200 creates a dictionary, which includes words that depict orientations of polarity (e.g., positive, neutral, negative, etc.) and adverbs that modify these words and discards words of a sentence of a comment of a customer feedback chat that match words in the dictionary. In this example, debiasing program 200 creates a multiset using the remaining words of the sentence and uses a data-to-text system (e.g., NLG techniques) to generate a textual summary using the remaining words of the sentence.

In yet another embodiment, debiasing program 200 utilizes an encoder with side constraints and a decoder with prefix constraints to neutralize the text. For example, debiasing program 200 adds tokens (e.g., side constraints) to the end of the source text (e.g., extracted relevant information) to indicate that the sentence of a comment of a customer feedback chat has a certain degree of positive or neutral polarity based on the domain. In this example, debiasing program 200 adds prefix constraints (e.g., a sequence of special tokens) to the beginning of the target sentence to ensure the polarity of the output text (e.g., decoded text). Additionally, debiasing program 200 uses a deep learning architecture that is comprised a plurality of variational autoencoder (VAE) and generative adversarial network (GAN) which can be used to decode text with constraints on polarity.

In step 214, debiasing program 200 validates the text. In one embodiment, debiasing program 200 utilizes user feedback to validate relevant information of the text is present in the neutralized text. For example, if a customer agent reports that the information is insufficient in the neutralized sentences of the comment of the customer feedback chat to understand an issue of the comment. In this instance, a supervisory customer agent may provide the missing relevant information from the original sentences of the comment of the customer feedback chat. Furthermore, debiasing program 200 utilizes the feedback from the supervisory customer agent to continue to train a neural network using the information loss. In this example, the loss function is a combination of multiple criteria (e.g., the difference in the number of relevant information fields of the input text and the number of relevant information fields retained in the neutralized text, the semantic dissimilarity between the neutralized comment with the original comment, etc.).

In another embodiment, debiasing program 200 utilizes a loss function to train a deep learning neural network and validate relevant information retention in the neutralized text with respect to the text. For example, debiasing program 200 utilizes a loss function (e.g., information loss and sentiment loss) to train a neural network-based model for validation of relevant information retention. In this example, the neural network (e.g., long short-term memory, encoder-decoder, GANs, VAEs, or any combination thereof, etc.) will be trained using the reconstruction error between the original input text and the output text and combined with polarity loss.

In step 216, debiasing program 200 debiases the neutralized text. In one embodiment, debiasing program 200 determines relevant information of the neutralized text and preserves the relevant information from the neutralized text. For example, debiasing program 200 identifies actions, observed behavior, emotions, products, product versions, error codes in the neutralized text and extracts the segments of the neutralized sentence that includes the identified relevant information. In this example, debiasing program 200 identifies the relevant information based on a domain of the customer support. In an example embodiment, when an agent accesses a customer feedback ticket, debiasing program 200 outputs a message to the user based on textual data of the customer feedback ticket. In this example, the message may include a sentiment neutral sentence that includes the relevant information to resolve a customer issue and an expressive tone of the sentence. Additionally, the message may include additional fields that include information about the impact type that explained in more detail in step 218.

In step 218, debiasing program 200 determines an impact type of the debiased text. Generally, an impact type is a category assigned to text that is representative of the effect of an underlying issue determined from the relevant information in the debiased text with respect to a certain domain. In one embodiment, debiasing program 200 utilizes a neural network to classify the debiased text to one or more impact classes. For example, debiasing program 200 uses a supervised learning technique with labeled training data (e.g., labeled relevant information) that represents one or more classes (e.g., productivity loss, service level agreement (SLA) miss, key performance indicator (KPI) impact, overpriced product, low quality, etc.) to train a multiclass classifier. In this example, debiasing program 200 uses the multiclass classifier to detect whether the debiased text input into the multiclass classifier has an impact, and if so, determines the impact class type of the debiased text.

In step 220, debiasing program 200 transmits the text to a user. In one embodiment, debiasing program 200 transmits debiased text with the determined impact and masked emotional state to a user. For example, debiasing program 200 retrieves the debiased text (i.e., the text has a neutral or positive polarity, the impact is identified, and with the necessary the relevant information to resolve the issue) and sends the generated debiased text to a user. In this example, debiasing program 200 can construct the generated debiased text in various formats. In one scenario, debiasing program 200 formats the generated debiased text into fields (e.g., issue, impact, emotional state, etc.). In another scenario, debiasing program 200 presents generated sentence based on the input text that excludes certain segments and is annotated with an impact class and emotional state. In another example, debiasing program 200 enables an automated agent to detect customer tones and issues and generate debiased responses that are transmitted to a customer service agent.

In another embodiment, debiasing program 200 accesses server 140 and generates a debiased version of textual data stored in storage device 142. For example, debiasing program 200 automatically accesses a customer feedback database and generates sentiment neutral textual data that includes relevant information and stores the textual data in a debiased text database. In this example, debiasing program 200 identifies impact classes for the textual data of the customer feedback database and stores the identified impact classes with the corresponding segments of debiased textual data in the debiased text database. In another example, debiasing program 200 may accesses a customer feedback database and performs debiasing tasks as a background process or intermittently subject to processing and computing demands of the computing system.

Figure 3:
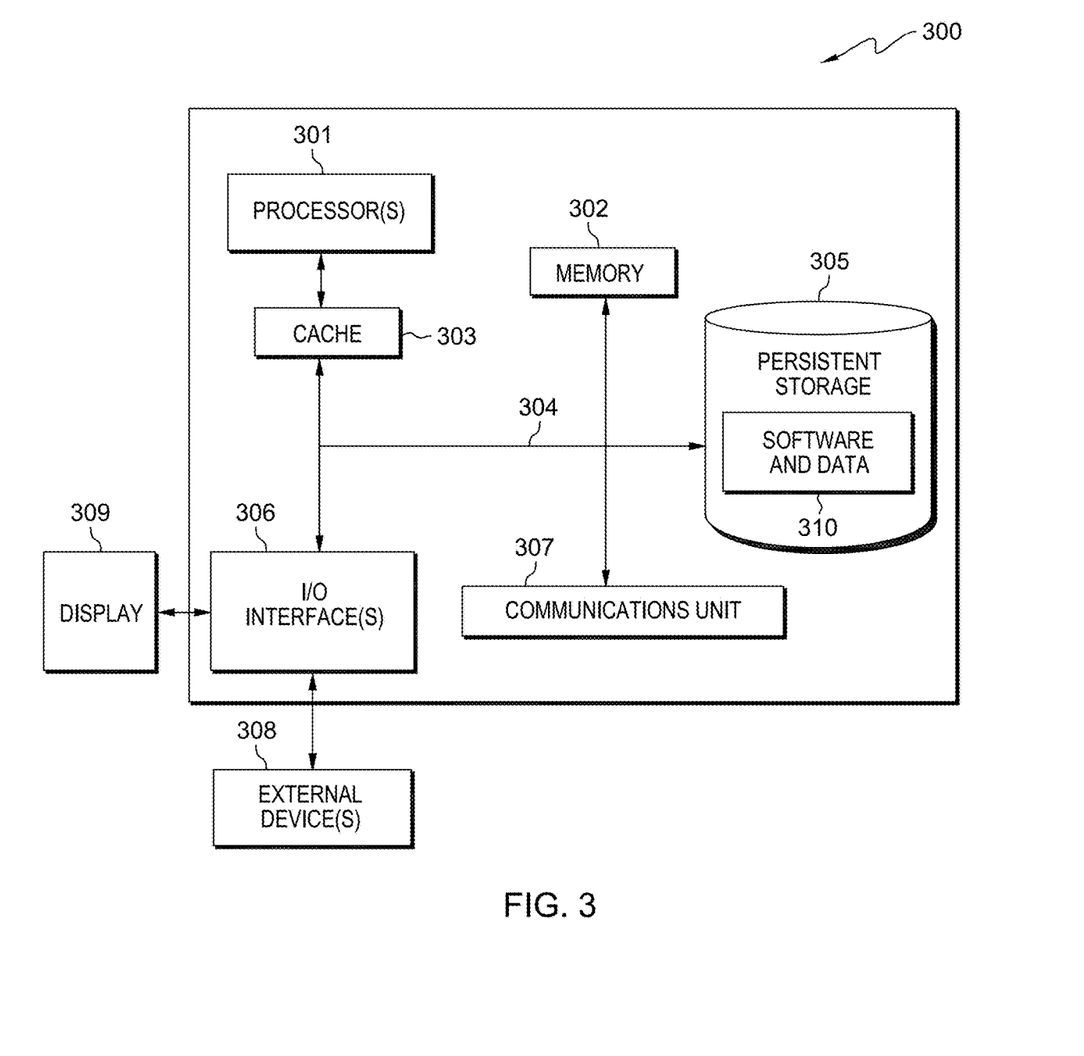
FIG. 3 depicts a block diagram of components of a computing system representative of the server of FIG. 1, in accordance with an embodiment of the present invention.

FIG. 3 depicts computer system 300, which is representative of client device 120, client device 130, and server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made. Computer system 300 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processor(s) 301 by holding recently accessed data, and data near recently accessed data, from memory 302.

Program instructions and data (e.g., software and data 310) used to practice embodiments of the present invention may be stored in persistent storage 305 and in memory 302 for execution by one or more of the respective processor(s) 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 310 can be stored in persistent storage 305 for access and/or execution by one or more of the respective processor(s) 301 via cache 303. With respect to client device 130, software and data 310 includes data of application 134. With respect to server 140, software and data 310 includes debiasing program 200 and data of storage device 142. With respect to client device 120, software and data 310 includes data of application 124.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data (e.g., software and data 310) used to practice embodiments of the present invention may be downloaded to persistent storage 305 through communications unit 307.

I/O interface(s) 306 allows for input and output of data with other devices that may be connected to each computer system. For example, I/O interface(s) 306 may provide a connection to external device(s) 308, such as a keyboard, a keypad, a touch screen, a microphone, a camera, a sensor, and/or some other suitable input device. External device(s) 308 can also include portable computer readable storage media, such as, for example, thumb drives, portable optical or magnetic disks, and memory cards. Program instructions and data (e.g., software and data 310) used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   determining, by one or more processors, a sentiment of textual data corresponding to a service request of a user;
   extracting, by one or more processors, information that is relevant to resolving a topic that is represented in the textual data;
   debiasing, by one or more processors, the textual data of the service request of the user, wherein debiasing the textual data further comprises:
      appending, by one or more processors, a token to one or more segments of textual data corresponding to the information that is relevant to resolving the topic, wherein the token corresponds to a side constraint that indicates a polarity of the sentiment of the information;
   validating, by one or more processors, that the debiased textual data of the service request includes a neutral polarity and the information that is relevant to resolving the topic that is represented in the textual data; and
   generating, by one or more processors, a debiased service request, that includes the one or more segments of textual data with a neutral polarity and the information that is relevant to resolving the topic, wherein the determined sentiment of the textual data is masked.

2. The method of claim 1, wherein extracting information that is relevant to resolving a topic that is represented in the textual data, further comprises:
   segmenting, by one or more processors, the textual data to include a respective sentiment annotation;
   parsing, by one or more processors, segments of the textual data to identify information relevant to one or more domains associated with the textual data, wherein the identified information is selected from the group consisting of: entities, actions, observed behavior, expressive tone, products, product versions, and error codes; and
   retaining, by one or more processors, the parsed segment of the textual data that include the identified information relevant to one or more domains associated with the textual data.

3. The method of claim 1, wherein debiasing the textual data of the service request of the user, wherein debiasing the textual data further comprises: further comprises:
   determining by one or more processors, a vocabulary of keywords for one or more domains associated with the textual data, wherein the keywords correspond to a negative polarity of the sentiment;
   identifying, by one or more processors, instances of keywords from the vocabulary of keywords in the extracted information;
   removing, by one or more processors, the textual data that corresponds to the identified instances of keywords from the vocabulary of keywords from the extracted information;
   creating, by one or more processors, a plurality of multisets of the textual data that include the extracted information with removed textual data that corresponds to the identified instances of keywords from the vocabulary of keywords; and
   constructing, by one or more processors, a textual summary of the extracted information using the plurality of multisets.

4. The method of claim 1, wherein validating that the debiased textual data of the service request includes a neutral polarity and the information that is relevant to resolving the topic that is represented in the textual data, further comprises:
   determining, by one or more processors, that the extracted information has a neutral sentiment based at least in part on the polarity of the sentiment of the information; and
   determining, by one or more processors, that the debiased information retains the information that is relevant to resolving the topic that is represented in the textual data.

5. The method of claim 1, further comprising:
   determining, by one or more processors, an expressive tone of the textual data based at least in part on the determined sentiment of the textual data; and
   determining, by one or more processors, an impact type for the extracted information, wherein the impact type is selected from the group consisting of: productivity loss, service level agreement miss, key performance indicator impact, overpriced product, and low quality.

6. The method of claim 5, wherein determining the expressive tone based at least in part on the determined sentiment of the textual data, further comprises:
   detecting, by one or more processors, segments of the textual data that affect the determined sentiment of the textual data;
   determining, by one or more processors, a trigger based on the detected segments, wherein the trigger is a word that is associated with the expressive tone; and
   determining, by one or more processors, the expressive tone of the textual data based on an aggregate of detected segments.

7. The method of claim 5, further comprising:
annotating, by one or more processors, the generated debiased textual data with a masked expressive tone of the textual data and the impact type; and
transmitting, by one or more processors, the generated debiased textual data to a user, wherein the generated debiased textual data includes a neutral sentiment.

8. A computer program product comprising:
one or more computer readable storage media and program instructions stored on the one or more computer readable storage media, the program instructions comprising:
program instructions to determine a sentiment of textual data corresponding to a service request of a user;
program instructions to extract information that is relevant to resolving a topic that is represented in the textual data;
program instructions to debias the textual data of the service request of the user, wherein debiasing the textual data further comprises:
program instructions to append a token to one or more segments of textual data corresponding to the information that is relevant to resolving the topic, wherein the token corresponds to a side constraint that indicates a polarity of the sentiment of the information;
program instructions to validate that the debiased textual data of the service request includes a neutral polarity and the information that is relevant to resolving the topic that is represented in the textual data; and
program instructions to generate a debiased service request, that includes the one or more segments of textual data with a neutral polarity and the information that is relevant to resolving the topic, wherein the determined sentiment of the textual data is masked.

9. The computer program product of claim 8, wherein program instructions to extract information that is relevant to resolving a topic that is represented in the textual data, further comprise program instructions to:
segment the textual data to include a respective sentiment annotation;
parse the segments of the textual data to identify information relevant to one or more domains associated with the textual data, wherein the identified information is selected from the group consisting of: entities, actions, observed behavior, expressive tone, products, product versions, and error codes; and
retain the parsed segment of the textual data that include the identified information relevant to one or more domains associated with the textual data.

10. The computer program product of claim 8, wherein program instructions to debias the textual data of the service request of the user, wherein debiasing the textual data further comprises: further comprise program instructions to:
determine a vocabulary of keywords for one or more domains associated with the textual data, wherein the keywords correspond to a negative polarity of the sentiment;
identifying instances of keywords from the vocabulary of keywords in the extracted information;
removing the textual data that corresponds to the identified instances of keywords from the vocabulary of keywords from the extracted information;
creating a plurality of multisets of the textual data that include the extracted information with removed textual data that corresponds to the identified instances of keywords from the vocabulary of keywords; and
constructing a textual summary of the extracted information using the plurality of multisets.

11. The computer program product of claim 8, wherein program instructions to validate that the debiased textual data of the service request includes a neutral polarity and the information that is relevant to resolving the topic that is represented in the textual data, further comprise program instructions to:
determine that the extracted information has a neutral sentiment based at least in part on the polarity of the sentiment of the information; and
determine that the debiased information retains the information that is relevant to resolving the topic that is represented in the textual data.

12. The computer program product of claim 8, further comprising program instructions, stored on the one or more computer readable storage media, to:
determine an expressive tone of the textual data based at least in part on the determined sentiment of the textual data; and
determine an impact type for the extracted information, wherein the impact type is selected from the group consisting of: productivity loss, service level agreement miss, key performance indicator impact, overpriced product, and low quality.

13. The computer program product of claim 12, wherein program instructions to determine the expressive tone based at least in part on the determined sentiment of the textual data, further comprise program instructions to:
detect segments of the textual data that affect the determined sentiment of the textual data;
determine a trigger based on the detected segments, wherein the trigger is a word that is associated with the expressive tone; and
determine the expressive tone of the textual data based on an aggregate of detected segments.

14. The computer program product of claim 12, further comprising program instructions, stored on the one or more computer readable storage media, to:
annotate the generated debiased textual data with a masked expressive tone of the textual data and the impact type; and
transmit the generated debiased textual data to the user, wherein the generated debiased textual data includes a neutral sentiment.

15. A computer system comprising:
one or more computer processors;
one or more computer readable storage media; and
program instructions stored on the computer readable storage media for execution by at least one of the one or more processors, the program instructions comprising:
program instructions to determine a sentiment of textual data corresponding to a service request of a user;
program instructions to extract information that is relevant to resolving a topic that is represented in the textual data;
program instructions to debias the textual data of the service request of the user, wherein debiasing the textual data further comprises:
program instructions to append a token to one or more segments of textual data corresponding to the information that is relevant to resolving the topic, wherein the token corresponds to a side constraint that indicates a polarity of the sentiment of the information;
program instructions to validate that the debiased textual data of the service request includes a neutral polarity and the information that is relevant to resolving the topic that is represented in the textual data; and program instructions to generate a debiased service request, that includes the one or more segments of textual data with a neutral polarity and the information that is relevant to resolving the topic, wherein the determined sentiment of the textual data is masked.

16. The computer system of claim 15, wherein program instructions to extract information that is relevant to resolving a topic that is represented in the textual data, further comprise program instructions to:

segment the textual data to include a respective sentiment annotation;

parse the segments of the textual data to identify information relevant to one or more domains associated with the textual data, wherein the identified information is selected from the group consisting of: entities, actions, observed behavior, expressive tone, products, product versions, and error codes; and retain the parsed segment of the textual data that include the identified information relevant to one or more domains associated with the textual data.

17. The computer system of claim 15, wherein program instructions to debias the textual data of the service request of the user, wherein debiasing the textual data further comprises: further comprise program instructions to:

determine a vocabulary of keywords for one or more domains associated with the textual data, wherein the keywords correspond to a negative polarity of the sentiment;

identifying instances of keywords from the vocabulary of keywords in the extracted information;

removing the textual data that corresponds to the identified instances of keywords from the vocabulary of keywords from the extracted information;

creating a plurality of multisets of the textual data that include the extracted information with removed textual data that corresponds to the identified instances of keywords from the vocabulary of keywords; and constructing a textual summary of the extracted information using the plurality of multisets.

18. The computer system of claim 15, wherein program instructions to validate that the debiased textual data of the service request includes a neutral polarity and the information that is relevant to resolving the topic that is represented in the textual data, further comprise program instructions to:

determine that the extracted information has a neutral sentiment based at least in part on the polarity of the sentiment of the information; and determine that the debiased information retains the information that is relevant to resolving the topic that is represented in the textual data.

19. The computer system of claim 15, further comprising program instructions, stored on the computer readable storage media for execution by at least one of the one or more processors, to:

determine an expressive tone of the textual data based at least in part on the determined sentiment of the textual data; and determine an impact type for the extracted information, wherein the impact type is selected from the group consisting of: productivity loss, service level agreement miss, key performance indicator impact, overpriced product, and low quality.

20. The computer system of claim 19, further comprising program instructions, stored on the one or more computer readable storage media, to:

annotate the generated debiased textual data with a masked expressive tone of the textual data and the impact type; and transmit the generated debiased textual data to the user, wherein the generated debiased textual data includes a neutral sentiment.

* * * * *